Patented May 25, 1926.

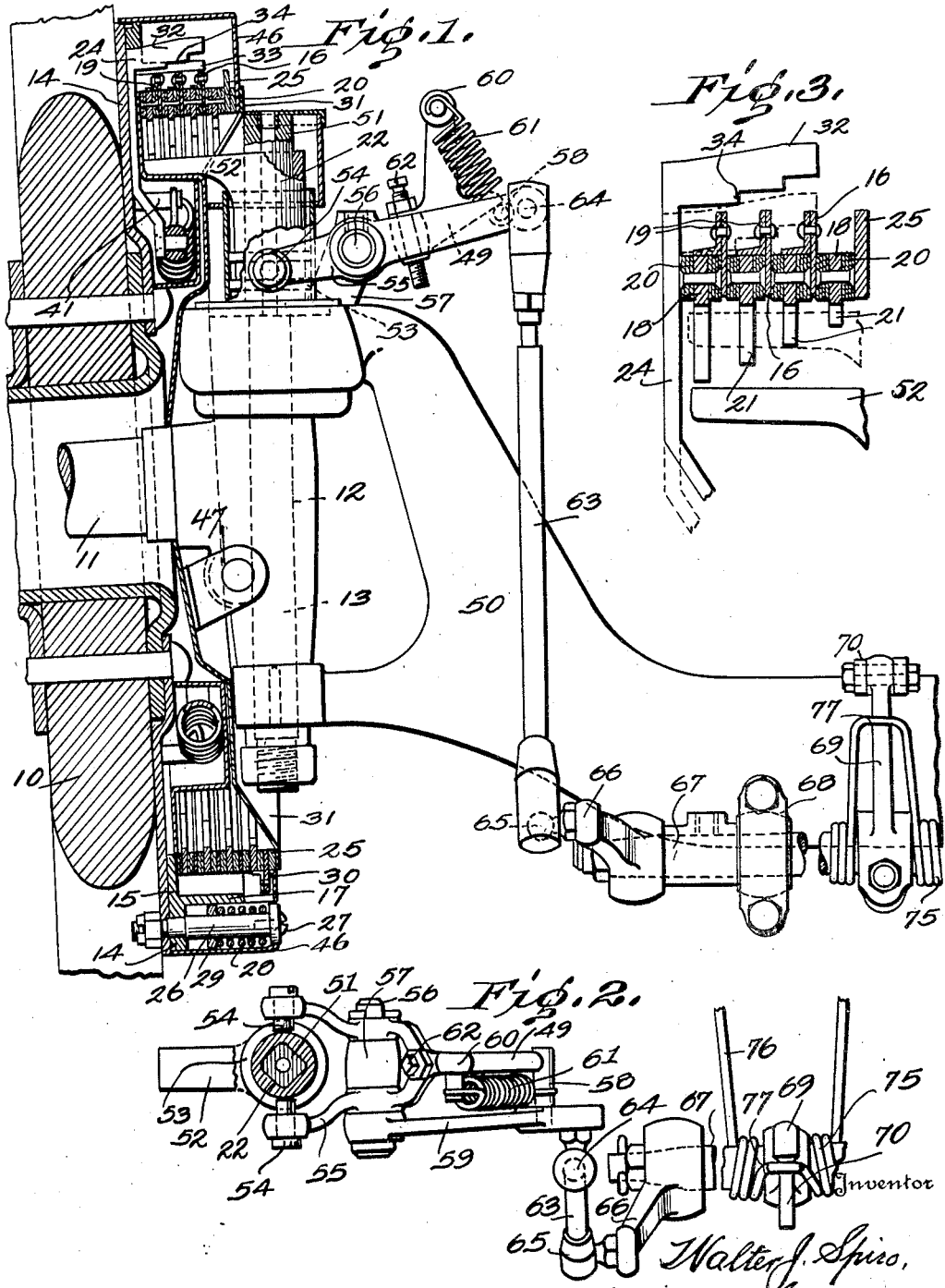

1,586,270

UNITED STATES PATENT OFFICE.

WALTER J. SPIRO, OF WHITE PLAINS, NEW YORK.

BRAKE ACTUATOR.

Original application filed April 23, 1924, Serial No. 708,449. Divided and this application filed January 2, 1925. Serial No. 167.

This invention relates to a brake actuator and particularly to a construction adapted for application to the type of friction vehicle brakes disclosed in my application for patent filed April 23, 1924, Serial No. 708,-449, of which this application is a division.

In the application of an actuator for holding the brake members in this character of brake it is important to successively engage the moving members to be held in order to effect a graduated braking effort and prevent a sudden application of the brakes which would result in discomfort and damage besides rendering the braked wheel liable to skid. It is further important to apply the actuator under a yielding tension to prevent violent impact between the parts moved into contact particularly when the brake is applied at a relatively high speed. In the use of an actuator moving in an arcuate path the stops upon the rings are not alined so as to have full bearing upon the sliding face of the actuator and there is a consequent tendency to force back the actuator. In the use of this type of brake in a four wheel braking system it is also desirable to maintain the relative positions of the operating connections in the different positions of the steering wheels.

To effect these improved results a novel construction has been provided embodying a series of brake rings having stop projections of successively different lengths disposed to cooperate with a yieldingly mounted sliding actuator and the mounting of such actuator relative to the king bolt of the wheel so that the operating lever therefor maintains a constant relation irrespective of the position of the wheel.

The invention has for an object to present a novel and improved construction and arrangement of the series of brake rings having contacts or stops of varying lengths extending radially thereof to cooperate with an actuator movable relative to said contacts.

Another object of the invention is to present a new form of sliding actuator yieldingly mounted to travel radially of the brake rings to be held when applying the brake so that the stops upon the rings will be alined and firm contact with the actuator maintained.

A further object of the invention is to provide a novel mounting for the actuator disposed co-axially with the king bolt of a wheel and provided with an operating lever and connections to maintain constant relation of the parts in the various positions of the wheel.

Other and further objects and advantages of the invention will be hereinafter set forth and the novel features thereof defined by the appended claims.

In the drawing—

Figure 1 is a vertical section through a wheel with the brake applied;

Figure 2 is a top plan of the brake actuating connections, with the post in section; and Figure 3 is an enlarged section of the upper portion of Figure 1.

Like numerals refer to like parts in the several figures of the drawing.

The invention has been disclosed as applied to a brake for a four wheel braking system for which it is particularly designed, and also in connection with a special form and mounting of the brake rings, but it is equally applicable to other uses and not limited to a vehicle brake of the type shown.

In the form illustrated the numeral 10 designates the wheel or driven member mounted upon the usual stud axle 11 having a bearing 12 through which the king bolt 13 extends. This wheel carries a plate 14 from which the drum 15 carrying the brake members is supported. These members comprise two series of friction rings of annular configuration, the rings 16 being adapted to be connected to and disconnected from the wheel, as described in my before mentioned application, and are supported at their periphery by the walls 17 of the drum. Intermediate of the rings 16 are the free frictionally held rings 18 of less diameter which are held against diametric movement by the angle brackets 19 secured at the other periphery of the rings 16. The rings 18 may be provided upon their opposite faces with brake shoes 20, and at their inner periphery are formed with stop lugs 21 to cooperate with a brake actuator 22. These lugs upon the different rings vary in the length of their inward diametric projection so that they will be successively engaged by the actuator in the rotation of the wheel and its movement toward the lugs until all of the lugs are brought into lateral alinement with a firm bearing on the face of the actuator when the brake is fully applied. This provides for a graduated application of the brake and the control thereof by an actuator reciprocating diametrically of the braking rings.

The braking rings 16 are secured to the wheel in any desired manner, for instance by the locking member 24 having the arm 32 formed with a stepped face 34 adapted to seat in recesses in the rings 16. The two series of braking rings are held in frictional contact by a pressure plate 25 from which an angular portion 29 extends and is disposed over a post 26 secured to the drum. A coiled spring 28 surrounding the post bears upon the portion 29 and is retained in position by the screw held plate 27 to maintain a braking tension upon the rings which may be adjusted as desired. The plate 25 may be provided with supporting brackets 30 for the outer rings 18. The parts just described are enclosed by a dust casing 31 carried by the lug 47 from the bearing 12.

The novel form of brake actuator herein disclosed is mounted upon the king bolt 13 carried by the main axle 50 which also supports the other connections to permit free steering movement of the wheels without affecting the brake actuation. The actuator 22 is slidingly mounted upon an angular standard 51 secured to the king bolt and provided with a lateral contact arm 52 to engage the stop lugs upon the series of braking rings. The actuator is formed at its base with a dwell collar 53 which receives the opposite pins 54 from the yoke 55 pivoted upon the shaft 56 mounted in a lug 57 from the axle 50. This yoke is formed with a finger 49 projected to engage a pin 58 carried by an arm 59 pivoted upon the shaft 56. The yoke is also provided with an angularly disposed standard 60 from which a spring 61 extends to the pin 58 to normally retain the yoke finger in contact with said pin while permitting a yielding separation of these members when the actuator arm is forced into contact with the rings. The extent of such movement and the downward travel of the yoke is adjustably determined by a set screw 62 mounted in the yoke to engage the axle in the braking action.

For the purpose of maintaining the operating connections in the different positions of the steering wheels, a rod 63 is pivoted at one end 64 in the arm 59 and at its opposite end connected by a knuckle joint 65 with a crank 66 upon a shaft 67 supported from the axle at 68. This shaft also carries a lever 69 from which the brake operating means 70 extend to the usual brake shaft operating means. The members controlled by the shaft 67 are normally tensioned in released position by a spring 75 encircling the shaft with its ends 76 disposed beneath the axle and its looped portion 77 engaging the lever 69. This construction provides for movement from the operating means 70 through the rock shaft 67 to the rod 63 which operates the yoke to lift the actuator by a sliding movement. When the contact arm thereon engages one of the rings or the lugs thereon it is yieldingly held, even if further pressure is applied to the brake, and thus successively slips into the spaces between the lugs of the several rings in case they are not in alinement at the time of application of the brake. The first ring held applies a limited braking resistance and this may be graduated to a fine degree by successively engaging the rings. The varying length of the lugs upon the brake rings facilitates this action as the diametric travel of the actuator brings it into contact with the lugs in succession.

The operation of the invention will be obvious from the foregoing description from which the simple and efficient construction presented will be apparent. This provides for a graduated application of the braking tension and practically avoids damage or breakage of the parts through a sudden or violent application of the brakes, as the yielding connection prevents further pressure by the actuator after it once engages the brake ring. The structure also permits the free steering in a four wheel brake system without affecting the operative connection for the brakes.

While the specific construction of the several parts have been shown and described, still the invention is not confined thereto as changes and alterations may be made without departing from the spirit of the invention as recited in the following claims.

What I claim is:—

1. In a friction brake, associated relatively movable friction rings, one thereof being provided with an inwardly extending stop disposed radially of the ring, and a radially movable actuator positioned to cooperate with said stop.

2. In a friction brake, associated relatively movable friction rings, one thereof being provided with an inwardly extending stop disposed radially of the ring, and a radially movable actuator having an operating face within said ring to engage said stop.

3. In a friction brake, associated relatively movable friction rings, one thereof being provided with a stop member, and an actuator having an operating face within said ring to engage said member and mounted to yield radially upon engaging the ring.

4. In a friction brake, associated series of relatively movable friction rings, one series thereof being provided with stop members projected for varied distances from the rings, and an actuator mounted to successively engage said members.

5. In a friction brake, associated series of relatively movable friction members, one series thereof being provided with stop members projected for varied distances from the rings, and a slidingly mounted actuator disposed to travel in a path radially of said members and engage the same.

6. In a friction brake, a wheel, a series of annular friction rings carried thereby, an intermediate series of brake rings normally rotatable with the friction rings, and a brake actuator disposed to yield radially and also adapted to retain said brake rings against rotation.

7. In a friction brake, a wheel, a series of annular friction rings carried thereby, an intermediate series of brake rings normally rotatable with the friction rings, and a reciprocating brake actuator constructed to yield radially and also adapted to retain said brake rings.

8. In a friction brake, a wheel, a series of annular friction rings carried thereby, an intermediate series of brake rings normally rotatable with the friction rings, inwardly projecting lugs of different lengths upon the successive brake rings, and a brake actuator disposed to successively engage said lugs to effect a graduated application of the brake.

9. In a friction brake, a wheel, a series of friction rings carried thereby, an intermediate series of brake rings normally rotatable with the friction rings, a slidingly mounted brake actuator adapted to engage and retain said brake rings a lever from the actuator, a power member, and a yielding connection between the lever and said member.

10. In a friction brake, a wheel, a series of friction rings carried thereby, an intermediate series of brake rings normally rotatable with the friction rings, a slidably mounted brake actuator adapted to engage and retain said brake rings, a lever from said actuator, a pivoted arm provided with a connecting pin, a spring extending from said lever to said pin, and a power connection extending from said arm to a control member.

11. In a friction brake, a steering wheel having an axle mounted upon a king bolt, interposed series of friction braking members carried by said wheel, one series being held to rotate therewith, a brake actuator mounted upon the axis of the king bolt to engage the other series of braking members, and a power connection for operating said actuator.

12. In a friction brake, a steering wheel having an axle mounted upon a king bolt, interposed series of friction braking members carried by the wheel, one series being held to rotate therewith, a brake actuator mounted upon the axis of the king bolt to slidingly engage the other series of braking members, and a power connection with said actuator to permit relative rotary movement thereof.

13. In a friction brake, a steering wheel having an axle mounted upon a pivot on the front axle, interposed series of friction braking members carried by said wheel, a sliding brake actuator mounted upon the axis of said pivot for rotative travel in the steering movement of the wheel and disposed to engage one series of said braking members, and an operating lever for said actuator having pivotal connection therewith.

14. In a friction brake, a steering wheel provided with a casing, an axle therefor, interposed series of braking rings disposed concentric of said axle and rotatable with the wheel, locking means for retaining one series of said rings against rotation, a yoke lever pivoted upon a fixed part and engaging said means, an arm freely mounted upon the pivot of said lever and having a lateral projection, and a spring extending from the yoke to said projection to normally retain the same in contact.

15. In a friction brake, a steering wheel provided with a casing, an axle therefor, interposed series of braking rings disposed concentric of said axle and rotatable with the wheel, locking means for retaining said rings against rotation, a yoke lever pivotally mounted upon said axle to engage said means, an arm freely mounted upon the pivot of said lever, a yielding connection between said lever and arm, a rod extended from said arm, a crank shaft having a knuckle connection with said rod, and means for applying power to said shaft.

16. In a friction brake, a wheel, an axle therefor, interposed series of braking rings disposed concentric of the axle and rotatable with the wheel, means for engaging the outer periphery of one series of said rings with the wheel, and radially movable braking means to manually engage the inner periphery of the other series to retain it against rotation.

17. In a friction brake, a wheel, a series of associated braking members alternately secured to the wheel and free thereof, an angular post, a sliding actuator mounted thereon to engage the free members, and an operating lever pivotally connected to said actuator.

18. In a friction brake, a wheel, a series of associated braking members alternately secured to the wheel and free thereof, a sliding actuator mounted to engage the free members and provided with an annular groove at its base, an operating lever having a yoke formed with pivots entering said groove, and an adjustable stop carried by said lever to limit its travel.

19. In a friction brake, a wheel, a series of associated braking members alternately secured to the wheel and free thereof, an actuating lever mounted to engage the free members, operating means for said lever, and a yielding connection between said means and lever to permit separation thereof.

20. In a friction brake, a wheel, a series of disks having outward radial projections adapted to be secured to the wheel, an associated series of disks having braking faces and inward radial projections, and radially movable means for retaining the latter disks against rotation.

21. In a friction brake, a wheel, a series of disks having outward radial projections adapted to be secured to the wheel, an associated series of disks having braking faces and inward radial projections, adjustable tension means for holding said disks in side contact, and an actuator radially movable within the disks to engage said projections.

In testimony whereo I affix my signature.

WALTER J. SPIRO.